United States Patent

Michaels

[11] 4,000,029
[45] Dec. 28, 1976

[54] CUTTING AND SEALING APPARATUS

[76] Inventor: Leo Michaels, 131 Beverly St., Boston, Mass. 02114

[22] Filed: Mar. 30, 1976

[21] Appl. No.: 672,049

[52] U.S. Cl. .............................. 156/510; 156/583
[51] Int. Cl.² ...................................... B32B 31/00
[58] Field of Search .......... 156/515, 583, 251, 290, 156/510

[56] References Cited

UNITED STATES PATENTS

| 3,505,149 | 4/1970 | Sanchez | 156/515 |
|---|---|---|---|
| 3,522,133 | 7/1970 | Gross | 156/515 |
| 3,717,538 | 2/1973 | Hartung | 156/515 |
| 3,868,291 | 2/1975 | Benz et al. | 156/515 |

*Primary Examiner*—Douglas J. Drummond
*Attorney, Agent, or Firm*—Burns, Doane, Swecker & Mathis

[57] ABSTRACT

A die assembly and machine incorporating the die assembly are disclosed which are operable to cut and hermetically seal irregularly shaped unstripped receptacles in overlying sheets of polyethylene material. The die assembly includes a first die means having a body portion and a cutting edge surface projecting therefrom which defines an irregular shape. An access opening extends through the body portion and is substantially encompassed by the cutting edge surface. A second die means has an external contour conforming to the irregular shape and is positioned within the cutting edge surface. The second die means is operable by means extending through the access opening of the body portion and includes a projecting sealing edge surface which is juxtaposed to the cutting edge surface. The body portion may be provided with cartridge heaters that provide the source of heat for both the cutting and the sealing operations. In operation the second die means is guided vertically by the cutting edge surface of the first die means. The cutting edge surface is heated by conduction from the body portion; similarly, the sealing edge surface is heated by conduction from the body portion. However, the sealing edge surface is only heated while the second die means is in a heat receiving position with the first die means.

10 Claims, 8 Drawing Figures

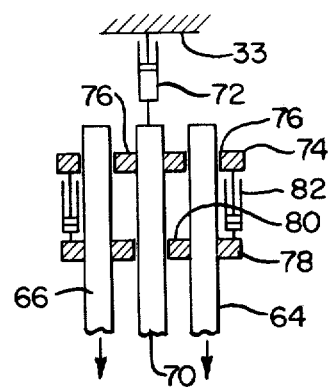
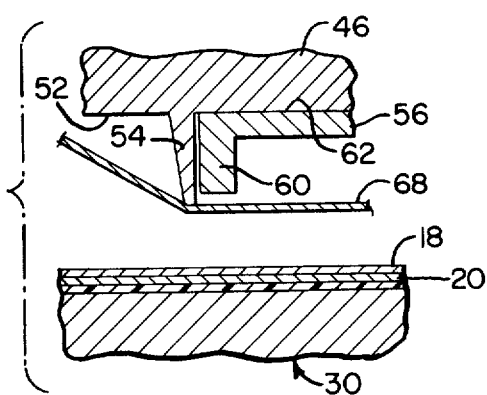
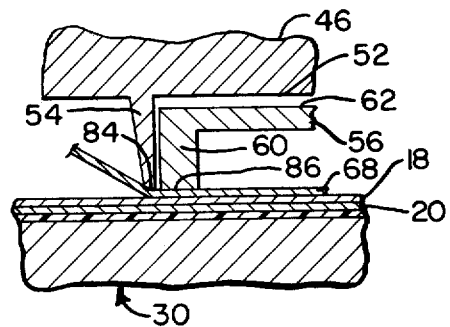
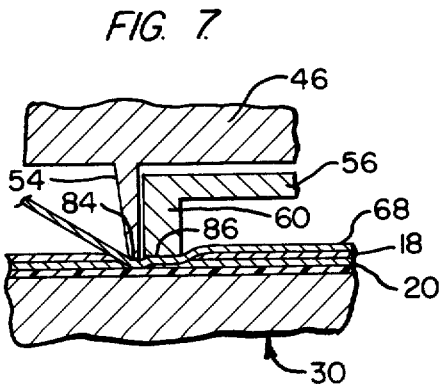
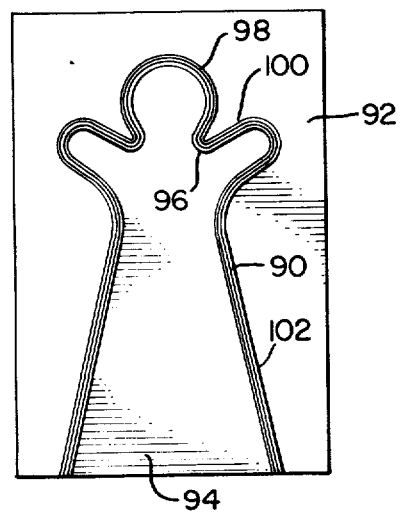

CUTTING AND SEALING APPARATUS

BACKGROUND OF THE INVENTION

This invention relates to apparatus for cutting receptacles from sheets of heat weldable material. More particularly, this invention concerns the unstripped cutting and hermetic sealing of irregularly shaped receptacles from sheets of heat weldable material.

In the past, receptacles fabricated from heat sealable synthetic resinous materials, such as polyethylene, have been widely used to package and store various objects and commodities. Some receptacles are generally rectangular and are fabricated from a tubular piece of heat sealable material. Other generally rectangular receptacles are fashioned from overlying sheets of heat sealable material.

To fabricate the generally rectangular receptacles, an essentially straight heated blade is often used. The heated blade first seals a straight edge of the receptacle and, when all the necessary edges are formed, a separate guilotine apparatus severs each receptacle from the substantially continuous sheets of material.

Typically, the heated blade has an internal heat source that is not easily shaped in complex contours. Accordingly, the heated blades are ordinarily linear. Moreover, each heated blade is usually provided with a separate heat source to provide control of its temperature.

Irregularly configured receptacles, as opposed to circular or rectangular receptacles, are used, for example, as novelty items and as liners in irregularly contoured vessels. Because of the irregular shape, known heated blades are not truly suitable for fabrication of these complex shapes.

One approach used in the cutting of irregularly shaped receptacles from sheet material is to mount a resistance wire on a plywood support. The supported wire is placed in contact with the sheets of heat weldable material. Then an electrical pulse is passed through the wire thereby heating it and allowing the heated wire to cut through the sheets of material.

With the hot wire apparatus, precise dimensional tolerances are difficult to obtain since the hot wire undergoes thermally induced linear expansion when the wire is pulsed. Moreover, the wire wears out quickly. A particularly disadvantageous feature of the hot wire apparatus concerns the fact that it actually strips or cuts out an irregular shape from the sheet material. In this fashion, each of the irregular shapes, as well as the parent sheet material, must be handled during fabrication and a concurrent expense is experienced. Additionally, the hot wire gives a receptacle an erractic edge configuration which typically has imperfections such as pin holes through which fluids can escape from the receptacle.

In the tire packaging art, concentric annular members have been used to separately cut and seal plastic packaging material around annular object prior to heat shrinking of the material to the object. An example is illustrated by U.S. Pat. No. 3,868,291 issued to Benz et al on Feb. 25, 1975. Apparatus for packaging solid objects is not concerned with providing an hermetic seal. Moreover, annular heating elements are not readily deformed to complex irregular shapes.

Where separate sealing and cutting operations are provided, they are ordinarily independent, rather than interdependent. Moreover, the sealing operation is not guided by the cutting operation to allow precise control of the spacing between the cut and seal lines. Accordingly, indexing of the separate cutting and sealing operations is required.

With known apparatus for simultaneously cutting and sealing, such as hot wire and heated blades, pin holes and similar imperfections occur along the cut line. Thus, an hermetic seal is not present. These pin holes are particularly objectionable as fluids may leak from the receptacle thereby rendering the receptacles unsuitable for use with fluids or, for that matter, sterile objects.

Thus, it will be seen that the need continues to exist for a truly effective apparatus capable of fabricating unstripped hermetically sealed irregular objects from heat sealable plastic materials.

Objects and Summary of the Invention

It is a general object of the present invention to provide a novel die assembly for the fabrication of irregularly shaped hermetically sealed receptacles from overlying sheets of synthetic resinous material.

It is a more specific object of the present invention to provide a novel two part die assembly for the fabrication of irregularly shaped receptacles from overlying sheets of synthetic resinous material in which a single source of heat is used for both cutting and sealing the overlying sheets.

Yet another object of the present invention is to provide a novel two part die assembly for the fabrication of irregularly shaped hermetically sealed receptacles in which an hermetic sealing portion is dependent from and guided by a cutting portion.

The above and many other objects of the present invention are substantially accomplished by the use of a die assembly comprising a first die member and a second die member. Preferably the first die member includes a body portion which is heated by a heat source that provides all the heat necessary for the die assembly. The body portion is thermally conductive so as to distribute and store heat.

To sever the material from which a receptacle or article is to be formed, a generally planar cutting edge surface projects from the body portion. The cutting edge surface may be located on a cutting bar projecting from the body portion so that a recess is defined thereby to receive the second die member. Preferably, the cutting bar is integrally connected to the body portion to provide good thermal conduction from the body portion to the cutting edge.

The cutting bar may be machined from the body portion so as to define an irregularly shaped outline conforming to the desired receptacle. The body portion is preferably provided with an access opening communicating with the recess, essentially circumscribed by the cutting bar and operable to receive an operating means for the second die member.

Disposed within the recess defined by the cutting bar is the second die member. The second die member has a perimeter which is shaped similarly to the irregular outline defined by the cutting bar. In this manner the second die member is positively positioned rotationally relative to the first die member. The second die member includes an outwardly projecting sealing edge surface juxtaposed with the cutting edge surface and having a width substantially exceeding the width of the cutting edge. The sealing edge surface creates an hermetic seal within the irregular outline defined by the cutting edge. Preferably, the sealing edge surface is carried by a sealing bar and is closer to the body portion than the cutting edge surface so that the first and second die members may be independently actuated.

The operating means extends through the access opening of the first die member and engages the second die member. The operating means moves the second die member from a heat receiving position in which it is in general surface contact with the body portion and a heat sealing position in which the sealing edge surface is in generally coplanar relation with the cutting edge surface.

The first die is preferably controlled such that the cutting edge does not completely sever a receptacle from parent material of the overlying sheets. In this manner, the irregularly shaped object is not stripped from the parent material and subsequent handling is facilitated.

In order to assure accurate positioning of the sealing edge surface member with respect to the cutting edge surface, the perimeter of the second die member is guided between the heat sealing and heat receiving positions by the cutting bar of the first die member. Accordingly, when the sealing edge surface is advanced into heat sealing relationship with sheet material, effective rotational as well as axial control is provided to permit accurate positioning and regulation of spacing between the cutting line and the sealing line.

To reduce the energy required to maintain the die assembly at operating temperature, as well as to reduce the expense of the overall die assembly, the sole heat source may comprise a plurality of cartridge heaters positioned in the body portion of the first die member. The cartridge heaters heat the cutting edge surface directly by conduction and, when the second die member is in the heat receiving position, supply heat by conduction to the second die member and thus the sealing edge surface.

The first and second dies are preferably fabricated of easily machined heat conducting material such as steel so that the dies have an extremely long useful life in comparison with cutting apparatus fabricated of less durable material.

By using the die assembly to form unstripped irregular receptacles, the die assembly is well adapted for use in machinery that intermittently advances sheets of heat weldable material to a position between the platen assembly and a die assembly. Accordingly, rapid automated production with minimal human supervision is accomplished.

BRIEF DESCRIPTION OF THE DRAWINGS

FIG. 4 is a schematic illustration of actuating apparatus for use in the apparatus and die assembly of FIG 1;

FIG. 5 is an enlarged view similar to FIG. 3 depicting the cutting and sealing edge surfaces of the die assembly in greater detail;

FIG. 6 is a view similar to FIG. 5 with the die assembly positioned in contact with sheets of heat sealable synthetic resin material;

FIG. 7 is a view similar to FIG. 6 at the end of the cutting and hermetic sealing operation; and FIG. 8 is a plan view illustrating yet another die assembly which can be fabricated in accordance with the present invention.

Description of the Preferred Embodiment

Figure 1:
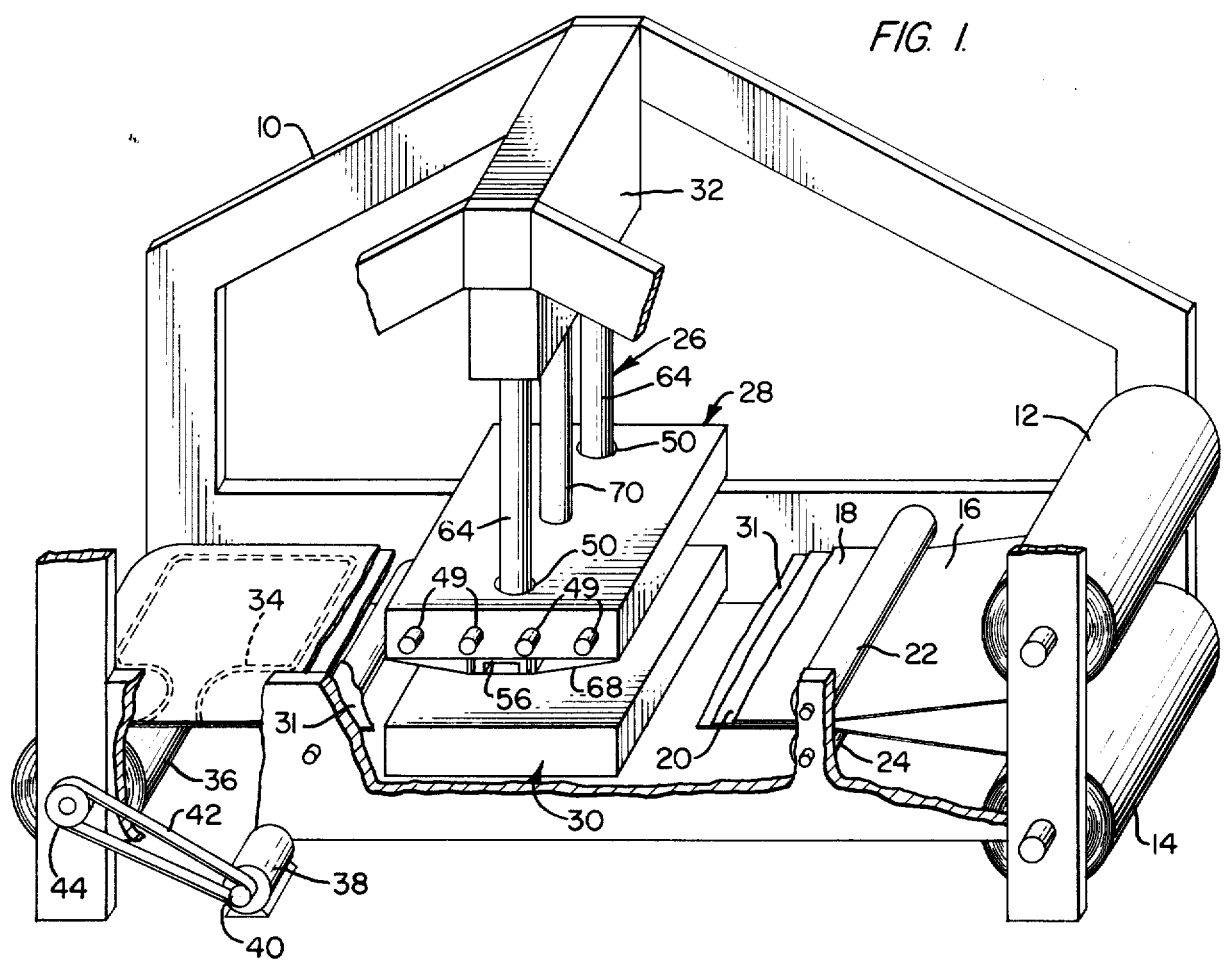
FIG. 1 is a perspective view of automated receptacle forming apparatus using a die assembly according to the invention with portions of the supporting structure removed for clarity.

Turning now to FIG. 1, automated apparatus is disclosed for the fabrication of irregularly shaped hermetically sealed receptacles or articles from two superposed sheets of heat weldable synthetic resinous material. The apparatus preferably includes a frame structure 10 which supports various components in the proper spatial relationship.

Mounted at one end of the frame 10 are two or more rolls 12, 14 of heat weldable synthetic resinous material. Connection of the rolls 12, 14 to the frame 10 may be accomplished in any suitable conventional manner that permits easy replacement of an empty roll with a full roll. A particularly suitable synthetic resinous material for use with apparatus of the present type is polyethylene.

One or both of the rolls of material 12, 14 may be printed as generally indicated at 16 with instructions for use, advertising material, or other desired information. The material from each roll 12, 14 is withdrawn in a sheet 18, 20, respectively, that may pass between a pair of guide rollers 22, 24 which are suitably mounted to portions of the frame 10. The guide rollers 22, 24 serve to orient the sheets 18, 20 in overlying or superposed relationship for delivery to the receptacle forming apparatus 26.

The receptacle forming apparatus 26 preferably includes a die assembly 28 and a platen assembly 30. The platen assembly 30 is suitably connected to portions of the frame 10 in a generally rigid manner. In addition, the film is supported, and carried over the platen assembly 30, by a resilient rubberized, continuous belt 31 which underlies the sheets 18, 20 during article formation. The die assembly 28 is preferably suspended from actuating means 32 which may be securely directly to the frame 10. For the purpose of clarity, portions of the frame 10 have been deleted from FIG. 1.

After passing the guide rolls 22, 24, the superposed sheets 18, 20 pass a forming station positioned between the die assembly 28 and the platen assembly 30. At the forming station, the die assembly 28 fashions an unstripped irregularly shaped hermetically sealed receptacle 34 in the parent material of the sheets 18, 20.

The superposed sheets 18, 20 with the unstripped receptacles 34 therein are subsequently advanced and wound up on a take-up roll 36 mounted at the second end of the frame 10. The take-up roll 36 may be intermittently advanced by asuitable sprocket drive assembly having a driven sprocket 44 on the take-up roll, a driving sprocket 40 driven by a motor 38 and a chain 42 interconnecting sprockets 40, 44.

Figure 2:
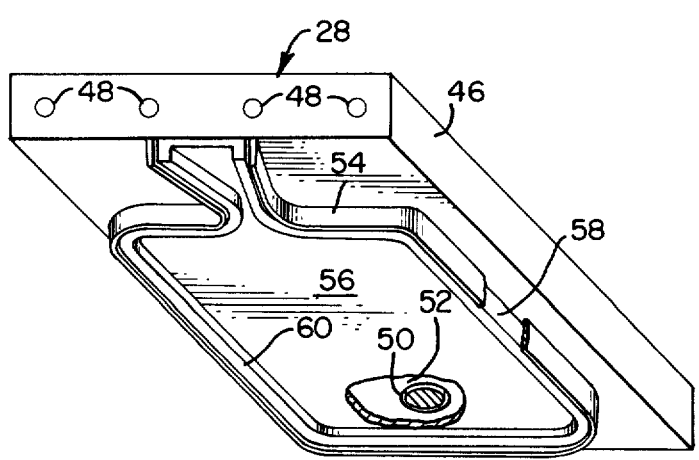
FIG. 2 is a perspective view of the die assembly of FIG. 1 with portions broken away to illustrate one irregular shape which may be fabricated.

With reference now to FIG. 2, the die assembly 28 is illustrated in greater detail. The die assembly 28 includes a first die member having a body portion 46 which may be generally rectangular in shape, as illustrated. The first die member is fabricated from a thermally conductive easily machined material such as aluminum or steel. A suitable conventional heat source may be used to heat the first die member to operating temperature. The relatively large mass of the body portion serves as a heat storage member and aids the maintenance of a uniform temperature.

The body portion 46 may include a plurality of generally parallel internally disposed openings, such as bores 48, each of which is adapted to receive a cartridge heater 49 (see FIG. 1). Preferably the bores 48 are spaced uniformly from one another and spaced by a uniform distance from a surface 52 (FIG. 2) of the body portion 46 so that the temperature distribution thereof is reasonably uniform.

The body portion 46 preferably includes a generally planar bottom surface 52 from which a cutting bar 54 projects. The cutting bar 54 is preferably integral with the body portion 46 and is heated by conduction therefrom. By machining material from a surface of the body portion 46, the cutting bar and a recess are defined. The cutting bar 54 essentially circumscribes the recess and defines a substantial portion of the perimeter of an irregularly shaped object.

Positioned within the recess and the contour delineated by the cutting bar 54 is a second die member 56. The external perimeter 58 of the second die member 56 is similar and generally conforms to the irregular shape defined by the cutting bar 54. By virtue of the similar shape, the absence of rotational symmetry and the interfitting relationship of the first and second die members, relative rotation therebetween is effectively controlled.

The second die member 56 includes an integral sealing bar 60 which may project from the peripheral edge thereof in a generally parallel relation to the cutting bar 54. The sealing bar 60 may be formed by machining away portions of the second die member 56. Preferably, the second die member 56 and the sealing bar are fabricated from the same easily machined thermally conductive material as the first die member.

Figure 3:
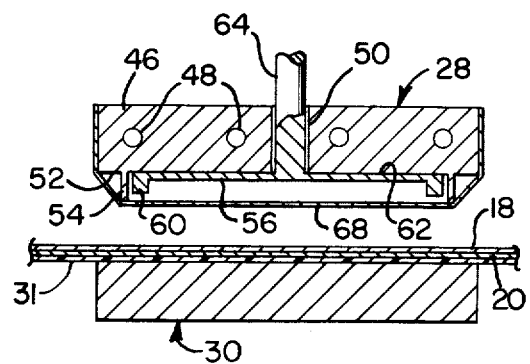
FIG. 3 is a view in partial cross section taken through the apparatus of FIG. 1 and illustrating the die assembly during positioning of sheet material therebelow.

Turning now to FIG. 3, the second die member 56 includes an upper generally planar surface 62 which can be moved into contact with the generally planar surface 52 of the body portion 46. With the second die member 56 in surface contact with the first die member, the second die member 56 is in a heat receiving position where heat is conductively transferred thereto from the first die member. Thus, only a single source of heat, the cartridge heaters 49, is required for both the first and second die members.

The body portion 46 (see FIG. 2) includes at least one, but preferably two, access openings 50 that extend therethrough and communicate with the bottom surface 52 in the recess. The second die member 56 is engaged by an operating means, such as the rods 64, 66 which project through the corresponding access openings 50 (FIG. 1). By providing two rods 64, 66, the second die member 56 is more easily controlled so as to be parallel to the surface 52. The operating means moves the second die member 56 generally perpendicularly to the surface 52 between the heat receiving position and a heat sealing position.

As seen in FIG. 3, the first die member may have a polytetrafluoroethylene sheet 68 connected thereto and extending across the plane defined by the cutting edge surface of the cutting bar 54. The polytetrafluoroethylene sheet is approximately 3 mils thick and provides a means for releasing the die assembly 28 from the polyethylene sheets 18, 20 at the end of a cutting and sealing cycle.

Returning briefly to FIG. 1, it will be seen that the die assembly 28 is suspended below the housing of the actuating means 32 by a suitable support 70 which may comprise a bar. Moreover, the second die member 56 is also suspended and controlled from the actuating means by the rods 64, 66 which extend through the access openings 50.

The entire die assembly 28 may be moved by any conventional means between a remote position, as illustrated in FIG. 1, in which the sheets 18, 20 are positioned on the platen assembly 30 and a cutting sealing position in which the die assembly 28 and the platen assembly 30 cooperate to form an unstripped receptacle in the sheets 18, 20. One suitable conventional means is the double acting fluid pressure cylinder 72 schematically illustrated in FIG. 4. One end of the cylinder 72 is connected to a support 33 of the actuating means 32 and the other end is connected to the bar 70. With this operating arrangement, a bracket 74 is carried by the actuating rod 70 and is provided with a pair of guide openings 76. Each guide opening 76 slidably receives one of the actuating rods 64, 66.

Vertically spaced from the first bracket 74 is a second bracket 78 which is suitably connected to each of the actuating rods 64, 66 of the second die member. The second bracket 78 has a guide opening 80 which slidably receives the shaft 70. In order to independently operate and control the second die member with respect to the first die member, one or more double acting fluid pressure cylinders 82 may be provided between and attached to the brackets 74, 78.

It should be apparent that extension of the cylinder 72 will cause the entire die assembly 28 to move toward the cutting sealing position adjacent the platen assembly 30 whereas contraction of the cylinder 72 will cause the die assembly 28 to move away from the platen assembly 30 to permit advancement of the polyethylene sheets. Similarly, extension of the power cylinders 82 will cause the second die member to move with respect to the first die member.

The fabrication of an irregularly shaped receptacle from a pair of superposed sheets of polyethylene material will now be described in greater detail in connection with FIGS. 5, 6 and 7. When the polyethylene sheets 18, 20 (FIG. 5) are positioned in superposed relationship on the platen assembly 30, the power cylinder 72 (see FIG. 4) is actuated and the die assembly 28 is moved vertically downwardly to the heating sealing position (FIG. 6). At this time the polytetrafluoroethylene sheet 68 contacts the uppermost polyethylene sheet 18. Heat is conducted from the body portion 46 to the cutting bar 54 and to the cutting edge surface 84. Typically the cutting edge surface 84 has a uniform width of about 1/32 inch.

While the second die member 56 is in the heat receiving position (FIG. 5), intimate contact between the generally planar surface 62 of the second die member 56 and the generally planar surface 52 of the body portion 46 allows conductive heat transfer to occur. In this manner the second die member 56 is maintained at its operating temperature.

After the cutting operation has begun, the second power fluid cylinders 82 (FIG. 4) are actuated to advance the second die member 56 toward the polytetrafluoroethylene sheet 68 and the heat sealing position (FIG. 7) to provide an hermetic seal in the superposed sheets 18, 20. The hermetic seal is positioned closely adjacent to the cutline formed by the cutting edge surface 84.

The sealing bar 60 has a sealing edge surface 86 with a generally uniform width approximately four times the width of the cutting edge surface 84, i.e., approximately ⅛ inch. With the second die member 56 in the heat sealing position (FIG. 7) both the first and second die members remain in contact with the polytetrafluoroethylene sheet 68 until the polyethylene sheets 18, 20 have been substantially cut and sealed.

It will be seen in FIG. 7 that the cutting edge surface 84 has penetrated approximately 90% of the combined thickness of the polyethylene sheets 18, 20. As the cutting edge surface 84 penetrates the polyethylene sheets, the polyethylene material recedes from the heated edge in an erratic manner and forms an imperfect seal. The hermetic seal is effected by the sealing edge surface 86 carried by the second die member 56. During sealing, the sealing edge surface 86 penetrates approximately 50% of the combined thickness of the sheets 18, 20.

When the die assembly 28 is retracted from its final position (FIG. 5), the irregular receptacle defined by the cutting bar 54 is not stripped from the superposed sheets 18, 20 of polyethylene material. Accordingly, the receptacles and parent material may be readily wound on the roll 36 (see FIG. 1) for ease in further handling.

The die assembly 28 illustrated in FIGS. 1 through 7 is but one of a multitude of irregular configurations which may be fabricated using the two piece die assembly of the present invention. More particularly, (FIG. 8) a die assembly may be easily constructed for fabrication of a complexly contoured receptacle defined by the cutting edge surface 90 carried by a first die member 92. A second die member 94 with a correspondingly contoured perimeter and a sealing edge surface is vertically movable with respect to the first die member 92.

Several characteristics of the types of irregular shapes which may be readily fashioned with the two piece die assembly of the present invention are depicted in FIG. 8. For example, acute angular junctions, illustrated at 96, between a bulbous curve 98 and generally straight portions 100, 102 are easily made. In fact, it will be appreciated that virtually the only constraint on any desired configuration is the ability to machine the cutting edge surface and the sealing edge surface.

From FIGS. 5 and 6 it will be noted that when the second die member 56 is guided during advancement from the heat receiving position of FIG. 5 to the heat sealing position of FIG. 6 by the cooperation and close spacing between the peripheral edge 58 and the cutting bar 54. In this manner, the positioning of the cutting and sealing surface 84, 86 can be accurately controlled and only a minimal waste of material occurs.

In addition, with the two part cutting and sealing die assembly of the present invention, indexing of the material sheets between successive operations is avoided.

By using the die assembly of the present invention in combination with material advancing apparatus it is possible for a single operator to simultaneously oversee the operation of several machines. Quite obviously this results in a substantial reduction in the cost of labor during production of irregularly shaped objects. Moreover, a high level of dimensional precision as well as reproducible consistency between sequentially fabricated receptacles is attainable, in contrast to heretofore known apparatus.

A particular advantage of the present invention is the provision of an hermetic seal positioned adjacent to the cut edge of the receptacle. The hermetic seal allows receptacles fabricated in accordance with the present invention to be used as containers for liquids without danger of leakage. Moreover, the use of heat to perform both the cutting and sealing operations provides a redundancy that improves reliability.

It should now be apparent that there has been provided in accordance with the present invention a novel die assembly for use in the fabrication of irregularly shaped receptacles from heat sealable synthetic resinous materials. It will be apparent to those skilled in the art that numerous modifications, variations, substitutions and equivalents exist for features of the invention which do not depart from the scope of the invention. Accordingly, it is expressly intended that all such modifications, variations, substitutions and equivalents which fall within the spirit and scope of the invention as defined in the appended claims be embraced thereby.

What is claimed is:

1. A die assembly for a shaped article having an hermetically sealed portion and being fabricated from heat sealable sheet material, comprising:
   first die means operable to cut a shape in superposed sheets of heat sealable material, the first die means including a thermally conductive body portion, thermally conductive cutting bar means projecting from the body portion having a cutting edge spaced from the body portion and perimetrically defining shape, and an access opening extending through the body portion to a location within the irregular shape;
   heating means operably positioned to heat the body portion to a temperature exceeding the temperature required for thermally cutting the material of the superposed sheets; and
   second die means operable to hermetically seal the shape along a portion cut by the first die means, having a perimeter conforming to the shape defined by the cutting bar, including a thermally conductive sealing bar projecting therefrom and having a sealing edge juxtaposed with the cutting edge, and operating means extending from the second die means through the access opening for moving the second die means relative to the first die means to and from a heat receiving position in which the second die means is operably positioned to receive heat from the body portion.

2. The die assembly of claim 1 wherein the cutting bar is integral with the body portion and the sealing bar is integral with the second die means.

3. The die assembly of claim 1 wherein:
   the body portion includes a plurality of generally parallel openings; and
   the heating means includes a plurality of cartridge heaters, each heater being received in a corresponding one of the plurality of generally parallel openings.

4. The die assembly of claim 1 wherein the cutting edge projects from the body portion farther than the sealing edge when the second die means is in the heat receiving position.

5. The die assembly of claim 4 wherein the cutting edge has a generally uniform width, the sealing edge has a generally uniform width, and the width of the sealing edge is substantially greater than the width of the cutting edge.

6. The die assembly of claim 1 wherein the second die means is guided during movement to and from the heat receiving position by the cutting bar of the first die means.

7. A die assembly for fabricating an irregular shape with an hermetically sealed peripheral portion from heat sealable sheet material, comprising:
- a first die member fashioned of thermally conductive material and including
  - a body portion having a generally planar surface, a plurality of generally parallel openings uniformly spaced from the planar surface, and an access opening extending through the body portion generally perpendicular to the planar surface, and
  - a cutting bar integral with the first die member, projecting from the planar surface, defining an irregular shape which generally circumscribes the access opening, and having a cutting edge with a generally uniform width located in a plane spaced from and generally parallel to the planar surface;
- a second die member fashioned of thermally conductive material, having a second planar surface, a perimeter generally conforming to the irregular shape, an integral sealing bar projecting therefrom with a sealing edge of generally uniform width lying in a plane spaced from the second planar surface by a distance less than the spacing between the first planar surface and the cutting edge, the second die member being operable between a heat receiving position in which the first and second planar surfaces are in heat transfer relationship and a heat sealing position in which the first and second planar surfaces are spaced from one another;
- a plurality of cartridge heaters, each cartridge heater disposed in a corresponding one of the plurality of openings in the first die member;
- operating means extending through the access opening, engaging the second die member and operable to move the second die member between the heat receiving and heat sealing positions thereof; and
- a polytetrafluoroethylene sheet operably positioned adjacent the cutting edge and the sealing edge to insure release of the die from sheet material being cut and hermetically sealed.

8. Apparatus for fashioning an irregular shape with an hermetically sealed peripheral portion from heat sealable sheet material comprising:
- platen means for supporting superposed sheets of material during fashioning of an irregular shape therein;
- a die assembly reciprocably mounted with respect to the platen means, operable between a remote position in which superposed sheets of material are positioned on the platen means and a cutting-sealing position in which the die assembly and platen means cooperate to hermetically seal and cut an unstripped irregular shape from the superposed sheets of material, and including
  - a first thermally conductive member having a body portion and a cutting edge surface projecting therefrom,
  - a second thermally conductive member having a sealing edge surface projecting therefrom in juxtaposition with the cutting edge surface and operable between a heat receiving position in which the second member is heated by the first member and a heat sealing position in which the second member hermetically seals the superposed sheets of material while the cutting edge surface is cutting an unstripped shape in the superposed sheets, and
  - heating means carried by the first member and operable to maintain the temperature of both the first and second members at different predetermined levels; and
- release means operably positioned between the die assembly and the platen means at the cutting-sealing position and operable to improve release of the die assembly from the sheets of material being cut and sealed.

9. The apparatus of claim 8 wherein the second member is guided between the heat receiving position and the heat sealing position by the projecting cutting edge of the first member.

10. The apparatus of claim 8 further including means for intermittently advancing continuous sheets of superposed material between the die assembly and the platen means.

* * * * *